(No Model.)  5 Sheets—Sheet 1.

H. SWINDELL.
REVERSING VALVE FOR FURNACES AND DEVICE FOR OPERATING THE SAME.

No. 277,079.  Patented May 8, 1883.

(No Model.) 5 Sheets—Sheet 2.

H. SWINDELL.
REVERSING VALVE FOR FURNACES AND DEVICE FOR OPERATING THE SAME.

No. 277,079. Patented May 8, 1883.

(No Model.) 5 Sheets—Sheet 3.
H. SWINDELL.
REVERSING VALVE FOR FURNACES AND DEVICE FOR OPERATING THE SAME.

No. 277,079. Patented May 8, 1883.

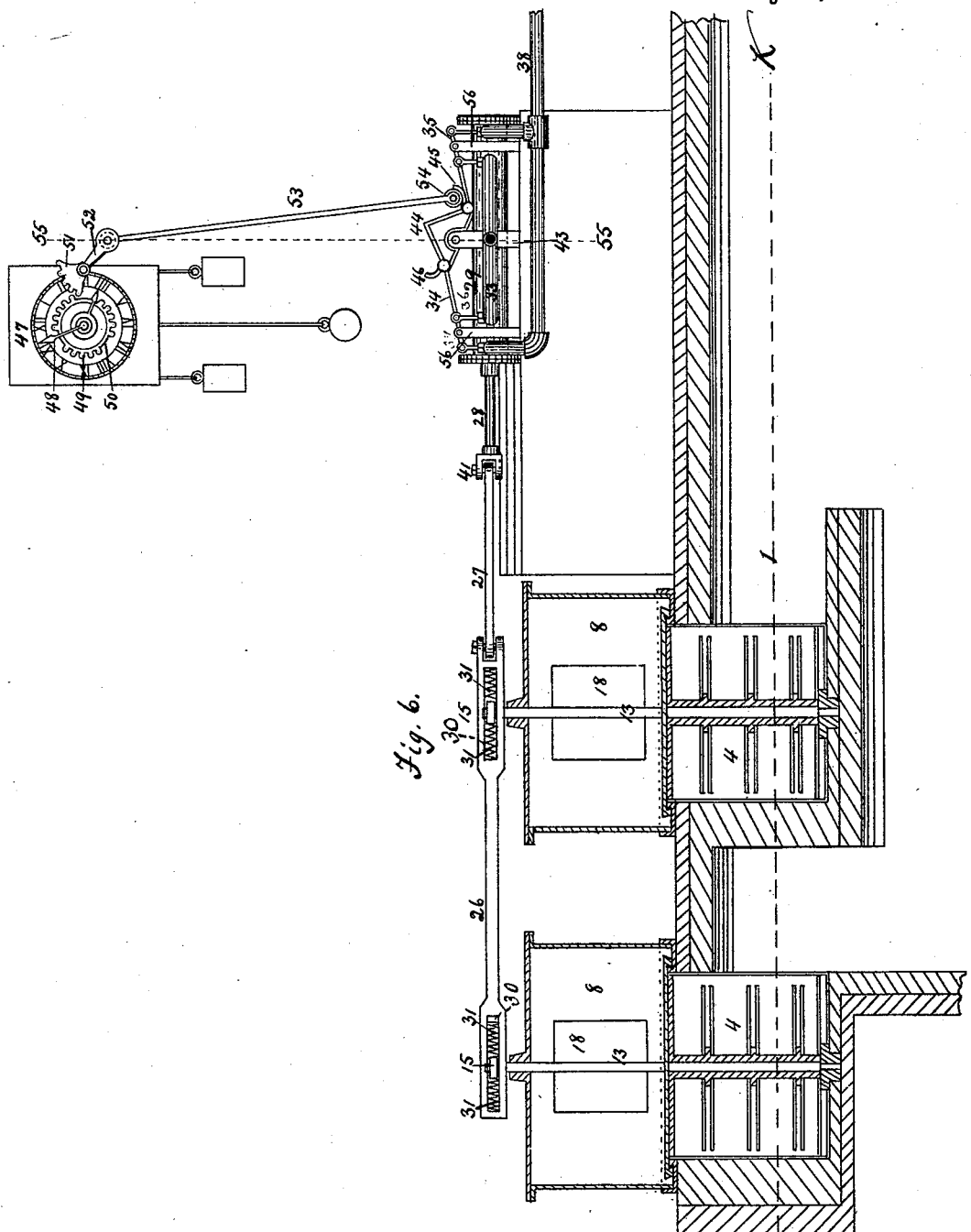

(No Model.) 5 Sheets—Sheet 5.
H. SWINDELL.
REVERSING VALVE FOR FURNACES AND DEVICE FOR OPERATING THE SAME.
No. 277,079. Patented May 8, 1883.
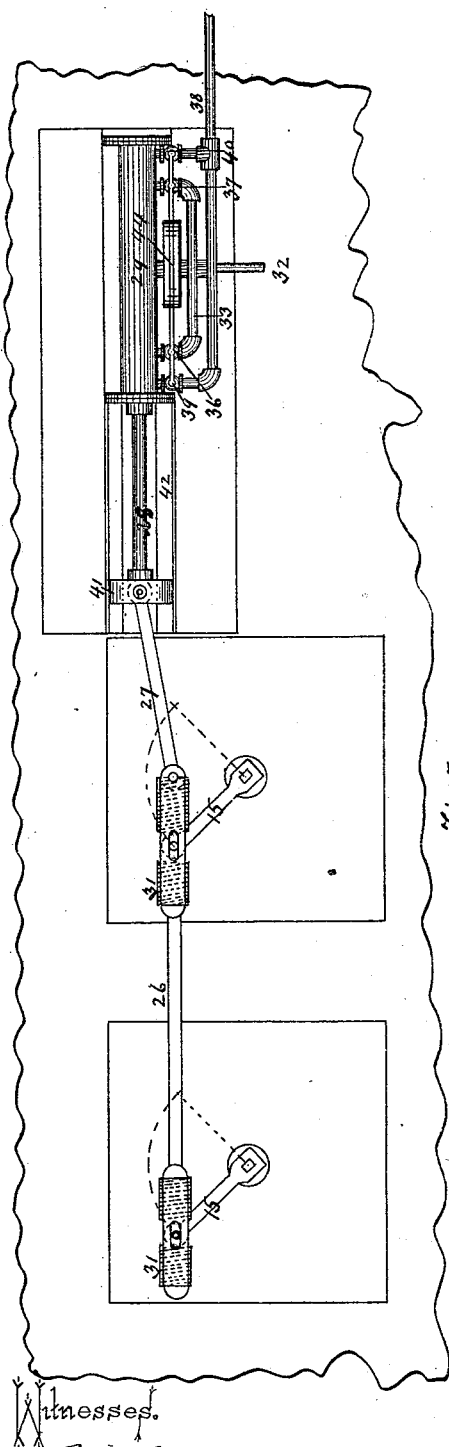
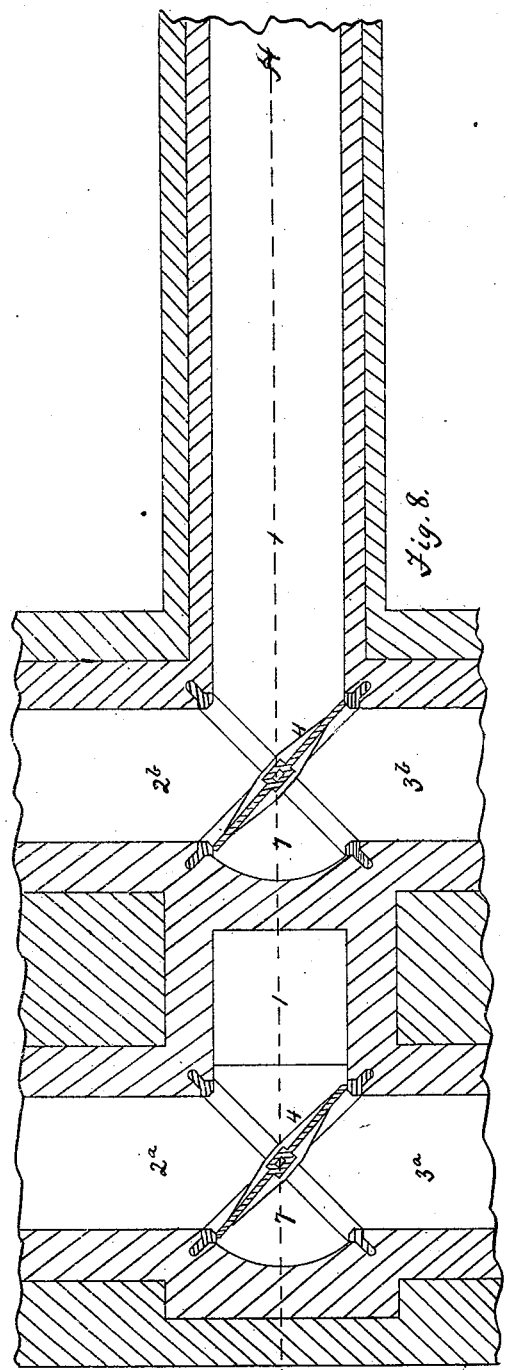
Witnesses.
Inventor.
Henry Swindell
by his attys
Bakewell & Kerr

UNITED STATES PATENT OFFICE.

HENRY SWINDELL, OF ALLEGHENY CITY, PENNSYLVANIA.

REVERSING-VALVE FOR FURNACES AND DEVICE FOR OPERATING THE SAME.

SPECIFICATION forming part of Letters Patent No. 277,079, dated May 8, 1883.

Application filed November 11, 1882. (No model.)

*To all whom it may concern:*

Be it known that I, HENRY SWINDELL, of Allegheny City, in the county of Allegheny and State of Pennsylvania, have invented a new and useful Improvement in Reversing-Valves for Furnaces and Devices for Operating the Same; and I do hereby declare the following to be a full, clear, and exact description thereof.

My invention consists, first, in an improved construction of reversing-valve for reversing gas-furnaces of all descriptions, whereby I am enabled to place the valve vertically instead of horizontally, as heretofore commonly practiced, and thereby avoid the checking of the draft caused by the heated products of combustion being compelled to rise in the chamber-flues, in order to pass the valve into the stack-flue; second, in the combination, with the reversing-valves, of a piston for working the valves, and a cylinder with automatically-operated valves; and, third, in the combination of the reversing-valves, piston, cylinder, and valves, with a clock-work for automatically operating the cylinder-valves.

To enable others skilled in the art to make and use my invention, I will now describe it by reference to the accompanying drawings, in which—

Figure 1:
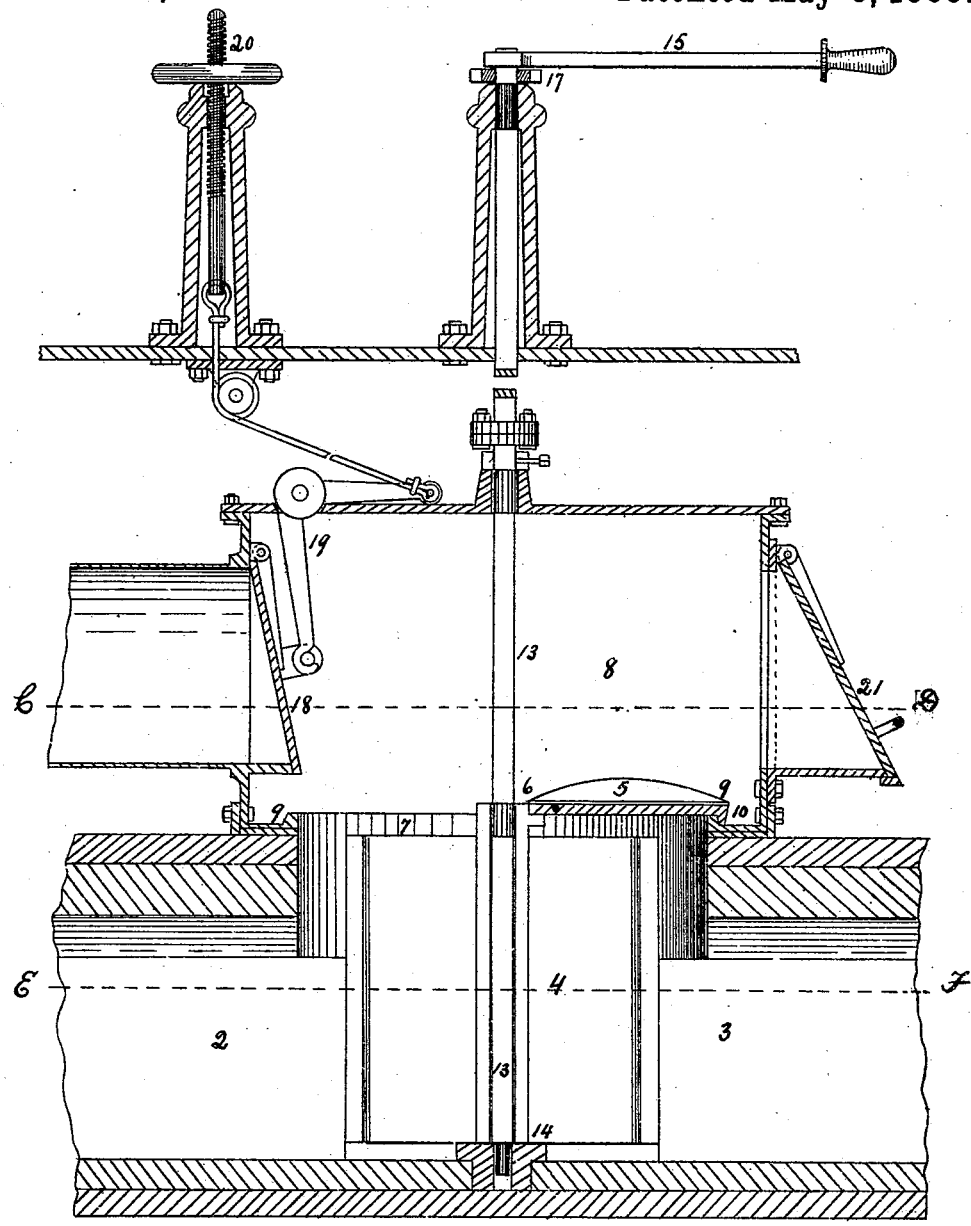
Figure 4:
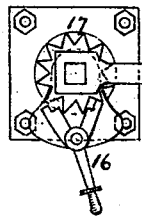
Figure 2:
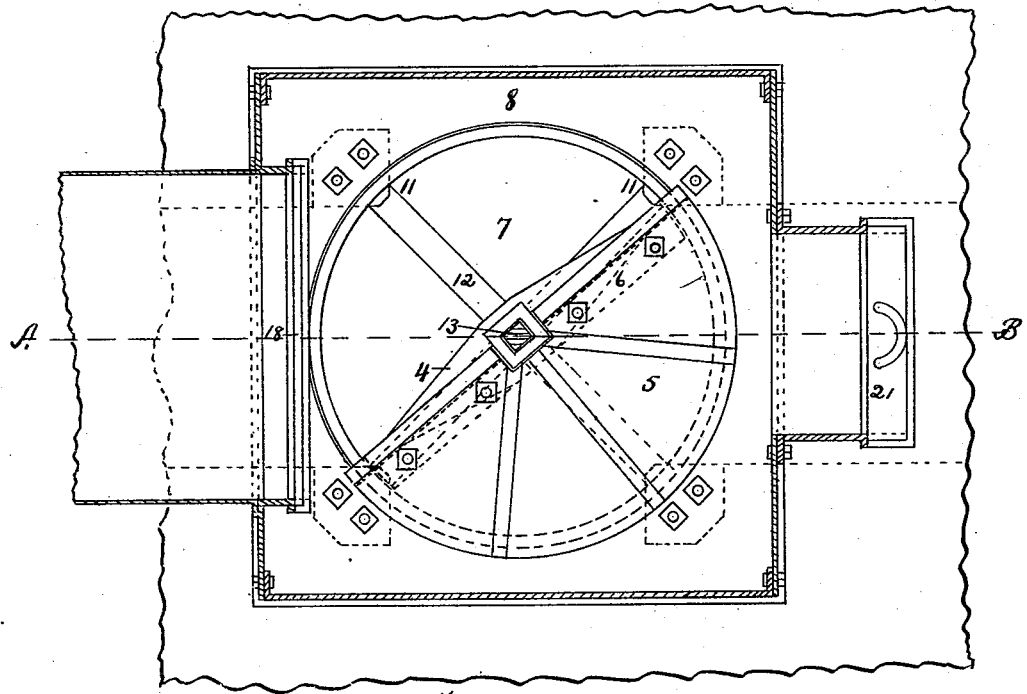
Figure 3:
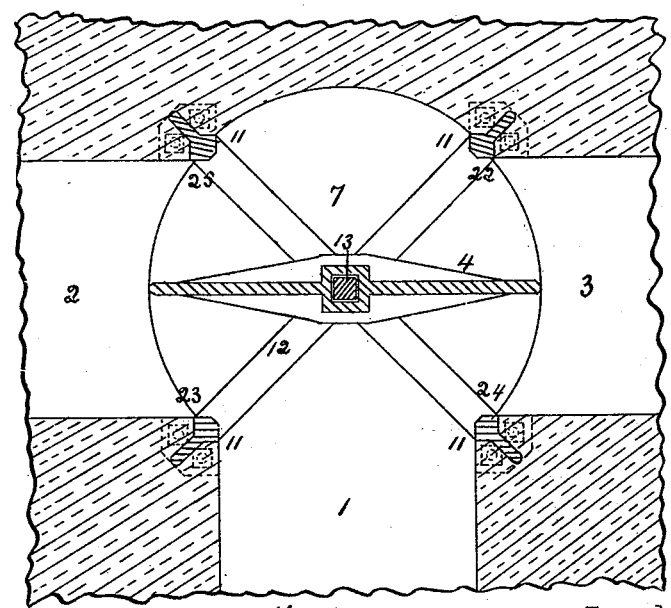
Figure 5:
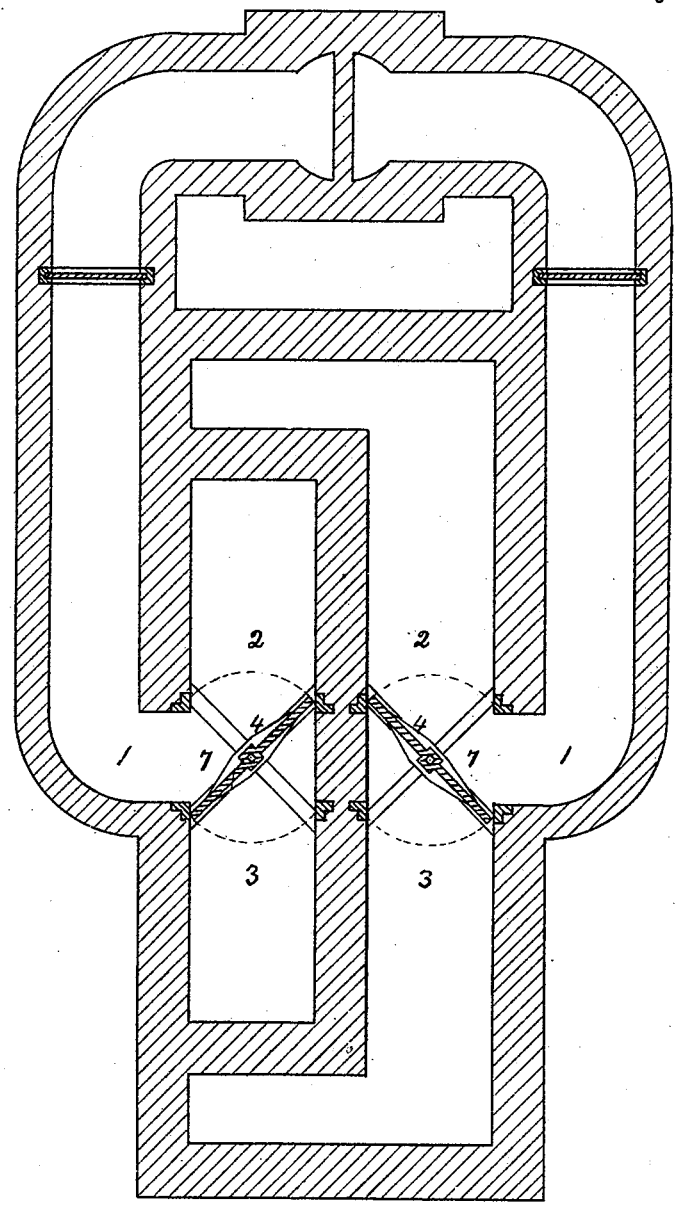

Figure 1 is a vertical section on the line A B of Fig. 2, showing the butterfly flap or valve on center. Fig. 2 is a sectional plan on the line C D of Fig. 1, through the gas or air box, showing the butterfly-valve and half-circle cover for same in position for working the furnace. Fig. 3 is a sectional plan on the line E F of Fig. 1, through the butterfly-valve and brick flues below the gas or air box, showing the valve on its center. Fig. 4 is a plan of the lever and ratchet for operating the valve when the automatic cylinder is not in operation. Fig. 5 is a sectional ground plan of the lower flues for a gas-furnace, showing the butterfly-valves in position for the waste heat products to pass into the stack-flue, and gas and air to pass into their respective chambers. Fig. 6 is a vertical section on the line G H of Fig. 8, showing both gas and air valves applied to a pot, open hearth, heating-furnace, or other reversing gas-furnace, the butterfly-valves being shown on center, and my automatic adjustable time valve and cylinder for reversing the valves in elevation. Fig. 7 is a ground plan of the automatic adjustable time valve and cylinder. Fig. 8 is a sectional plan, on the line I K of Fig. 6, of the flues leading from the gas and air chambers to the stack-flue with butterfly-valves shown in position.

Like letters and figures of reference indicate like parts in each.

In applying my improved reversing-valve I dispense with what in former constructions is known as the "valve-chamber," in which the reversing-valves work, and place the valves down in the chamber-flues at their junction with the stack-flue, as shown in Figs. 1 and 2.

In the drawings, 1 is the stack-flue. 2 3 are the flues leading each way to the regenerators, and 4 is the reversing-valve, having a cover, 5, bolted securely to a flange, 6, cast on top of the valve, and of semicircular form, so as to close one-half of the circular opening or drop-flue 7 in the bottom of the distributing-box 8. Around the edge of the opening 7 is a bead, 9, over which the flange 10 on the cover 5 extends, Fig. 1, the purpose of which is to afford a guide for the circularly-moving cover, and to make a tighter joint between the parts to prevent leakage of air and gas around the edges. The drop-flue 7 is provided with metallic columns or corner-pieces 11, bolted to the bed-plate cross 12, and also to the bottom of the box 8. These corner-pieces are the seats against which the valve 4 shuts. The valve 4 is provided with a vertical shaft, 13, which turns in a boss or step, 14, cast in the bed-plate 12, and passes through the valve, and out through the top of the box 8, where it is provided with a lever, 15, and a pawl and ratchet, 16 and 17, the first to impart motion to the valve 4 and cover 5, and the latter to hold the valve firmly against the corner-pieces 11 when the automatic cylinder hereinafter described is not in operation. The valve 18 regulates the flow of gas or air into the box 8, and is operated by the crank-lever 19 and screw 20. 21 is a cleaning-door. The action of this valve differs from the valve now generally in use by turning on a vertical shaft instead of a horizontal one. Its operation is as follows, viz: Supposing the beveled extremities of the valve 4 to be in contact with the seats 22 and 23, Fig. 3, and the extremities of the semicircular cover 5 in contact with the same points, the box 8 is cut off from connection with the chamber-flue 3, and the waste-heat products from the chamber-flue 3 pass directly into the stack-flue 1, the cover 5 preventing them escaping into the box 8, and the valve 4 preventing them passing into the chamber-flue 2. At the same time the gas or air is passing from the box 8 down through the uncovered semicircular opening 7 into the chamber-flue 2. By turning the valve 4 so as to bring its extremities in contact with the seats 24 and 25, Fig. 3, the action is reversed, and the waste heat products are caused to pass from the chamber-flue 2 to the stack-flue 1, and the gas or air from the box 8 to the chamber-flue 3.

In the valve now generally in use it is necessary for the waste heat products to rise in order to pass through the valve into the stack-flue. This checks the draft to the stack and interferes with the working of the furnace. In my valve this difficulty is overcome by setting the working part of the valve in the flues and on the same level therewith, thus giving a direct passage to the stack. The sectional plan in Fig. 5 shows the position and operation of the valves as applied to the flues of both chambers of the furnace. For operating these valves I apply an automatic reversing-cylinder, controlled by a clock, so as to reverse the valves every fifteen, twenty, or thirty minutes, as the case may require. The cylinder may be operated by steam, fluid-pressure, or compressed air. This construction is illustrated in Figs. 6, 7, and 8.

In Fig. 8, 2ª and 3ª indicate the flues which lead from the gas-regenerators, and 2ᵇ and 3ᵇ the flues which lead from the air-regenerators. The valves 4 are shown in position to lead the waste gases out through the flues 2, and to permit the air and gas to enter through the flues 3, the air and gas descending from distributing-boxes 8, placed over the drop-flues 7.

The levers 15, Figs. 6 and 7, are connected to a rod, 26, by extending through slots 30, made therein, which slots are provided with springs 31, bearing against the opposite sides of the levers, so as to form a cushion for the valves and to allow of some freedom of motion to each valve, so that in the event of one valve seating before the other the latter will be caused to come to its seat without breaking the first valve or its lever, the springs permitting a sufficient movement of the rod 26 to bring the second valve to place, so that both valves will find an equal bearing against their seats and the proper operation of the furnace will be insured. This feature is of importance, because the valves are more or less liable to warp on account of the intense heat to which they are exposed. The rod 26 is connected by a pivoted link, 27, to a piston-rod, 28. The rod 28 extends into a cylinder 29, in which it is fitted with a suitable piston-head, and it is guided in its movement by a slide, 41, which moves on ways 42. The cylinder 29 is provided with the usual inlet and outlet ports at both ends. The steam or other medium of pressure is admitted by a pipe, 32, from which branch pipes 33 extend to the entering-ports. The exhaust-ports are connected with an exhaust-pipe, 38. The inlet-pipes are controlled by valves 36 and 37, and the exhaust-pipes by valves 39 and 40. Pivoted to a standard, 43, is a triangle, 44, to the ends of which are pivotally attached levers 34 and 35, said levers being pivoted to the standards 56, placed between the inlet and outlet valves at the opposite ends of the cylinder. The stems of the valves 36, 37, 39, and 40 are pivotally attached to the levers 34 and 35, and the valves are operated thereby.

On the ends of the triangle 44 are shoes 45 and 46. The levers 34 and 35 are operated by the triangle 44. When the triangle is in the position shown in Fig. 6, the inner end of the lever 35 will be depressed, and the inner end of the lever 34 will be raised. This will cause the valve 36 to be opened to admit steam to the front end of the cylinder, and the exhaust-valve 40 to be opened to admit of the exhausting of the cylinder at the rear end. It will also close the valves 37 and 39. When the triangle is turned the other way, the valves 36 and 40 will be closed, and the valves 37 and 39 opened.

Placed above the cylinder, in a suitable position, is a clock-work, 47, to the minute-hand 48 of which, or to other suitable part, I attach a gear-wheel, 49, the teeth of which are broken away, as at 50. At the side of the gear-wheel 49 a segmental gear, 51, is journaled in such a position that its teeth shall mesh into the teeth of the gear-wheel. On the rear end of the segment 51 is an arm, 52, to which is pivoted a rod, 53, having a roller, 54, at its lower end, said roller being in contact with and moving over the inclined upper surfaces of the triangle 44, and when the triangle is thrown to either side capable of resting in one of the shoes 45 or 46. The purpose of this construction is to cause the automatic reversal of the valves 4 three times an hour, or every twenty minutes, and its operation is as follows: The gear-wheel 49 comes in gear with the segment 51 when the parts are in the position shown in Fig. 6, and gradually causes the segment to be drawn down and to raise the arm 52, with its rod 53, to a true vertical position, (indicated by the line 55.) By this time the plain space of the gear-wheel 49 comes around and the segment is released and permits the arm 52, with its rod 53, to fall. The triangle being in the position shown in Fig. 6, the roller 54 descends on its left incline until it comes in contact with the shoe 46, when the weighted rod 53 will cause the triangle to turn on its center and to depress the lever 34 and raise the lever 35. This will close the valves 36 and 40, and open the valves 37 and 39, admitting the pressure to the right side of the piston-head, and causing the piston to throw the levers 15 into the position shown in Fig. 7, and thereby reverse the valves. When the rod 53 is drawn up again by the operation of the gear-wheel 49 and quadrant 51 it will fall upon the right incline of the triangle, and thus cause the piston-rod 28 to be drawn into the position shown in Fig. 6, and again to change the valves. This operation is repeated, as before stated, every twenty minutes, and during the time that the piston is at rest the pressure is constantly on it, so that it holds the valves tightly in place. By spacing the gear-wheel 49 properly the reversal can be caused to take place any given number of times in an hour.

The advantage of my automatic reversing device is that it will reverse the valves at regular intervals, and thus prevent the furnace from working longer one way than the other. This enables both sets of regenerators to be kept at an equal temperature, and thereby saves wear and tear of the furnace and prevents one side from being burned out before the other, as is often the case at present, owing to the carelessness of the workman and to the fact that the time of reversal is largely guess-work in the majority of cases.

If desired, a gong may be attached to the cylinder, to be struck by a suitable arm or tappet extending from any of the moving parts, so as to indicate by sound the reversal of the furnace. Also, the clock, gong, or bell may be fitted to ring at the proper time for the reversal, and to ring continuously in case from any cause the reversal is not made.

The pawl and ratchet shown in Figs. 1 and 4 are designed for use when the automatic cylinder is not used, in which case the levers 15 are disconnected from the rod 26 and may be used by hand.

The within-described mechanism may be applied to any valve which requires to be operated at given intervals.

What I claim as my invention, and desire to secure by Letters Patent, is—

1. In a regenerator-furnace, the combination, with a vertical flue and diverging horizontal chamber-flues, of a vertical reversing-valve having a segmental cap or cover extending laterally at its upper end over one side of the flap and arranged in the chamber-flues at their junction, substantially as and for the purposes described.

2. The combination, in a reversing-furnace, of the gas or air entering flue, a drop-flue leading down from said chamber into the chamber-flues, with a vertical reversing-valve having a segmental cover extending laterally from the upper end of the valve over one side of the flap, and the chamber and stack flues, substantially as and for the purposes described.

3. The combination, with the chamber-flues of a regenerator, of two or more valves operated by crank-levers, with a rod for actuating the levers, and an elastic or yielding connection between the actuating-rod and the levers, substantially as and for the purposes described.

4. In a regenerator-furnace, the combination, with two reversing-valves, of a yielding or compensating connecting-rod and an automatically-operated piston for reversing the valves, substantially as and for the purpose specified.

5. The combination of a valve or valves with a piston for operating the same, a cylinder, and a clock-work for operating the cylinder-valves at given intervals, substantially as and for the purposes described.

6. The combination of the cylinder-valves, a pivoted triangular lever, and pivoted levers connected to and operated by the triangular lever, a piston-rod, and reversing regenerator-valves operated thereby, a gravity device alternately raised and dropped upon the opposite inclines of the triangular lever, substantially as and for the purposes described.

7. The combination of the cylinder-valves, pivoted triangle, and valve-levers, a gravity device for operating the valve-levers, a segmental geared lever for raising the gravity device, a gear-wheel having plain spaces operated by clock-work, for engaging and releasing the geared segment, with each other, and with a piston, and regenerator-valves operated thereby, substantially as and for the purposes described.

In testimony whereof I have hereunto set my hand this 8th day of November, A. D. 1882.

HENRY SWINDELL.

Witnesses:
 W. B. CORWIN,
 T. B. KERR.